United States Patent [19]

Thomas et al.

[11] Patent Number: 5,452,624
[45] Date of Patent: Sep. 26, 1995

[54] TILT STEERING COLUMN LOCKING MECHANISM

[75] Inventors: David E. Thomas, Rochester Hills; William M. Snell, Grand Blanc; Rodney L. Eaton, Clarkston, all of Mich.

[73] Assignee: Chrysler Corporation, Highland Park, Mich.

[21] Appl. No.: 205,221

[22] Filed: Mar. 3, 1994

[51] Int. Cl.⁶ .................................................. B62D 1/18
[52] U.S. Cl. ................... 74/493; 74/540; 280/775
[58] Field of Search ................. 74/493, 540; 280/775

[56] References Cited

U.S. PATENT DOCUMENTS

| | | |
|---|---|---|
| 4,470,322 | 9/1984 | Beauch ............................... 74/493 |
| 4,594,909 | 6/1986 | Yamaguchi ........................ 74/493 |
| 4,892,330 | 1/1990 | Beauch ............................ 74/493 X |
| 5,143,402 | 9/1992 | Higashino et al. ............... 74/493 X |
| 5,144,855 | 9/1992 | Yamaguchi et al. ................ 74/493 |

FOREIGN PATENT DOCUMENTS 58-85757  5/1983  Japan .................................. 74/493

Primary Examiner—Allan D. Herrmann
Attorney, Agent, or Firm—Edward A. Craig

[57] ABSTRACT

Apparatus for releasably locking the tilt steering column assembly of an automotive vehicle in adjusted position. A rack on the steering column assembly is engaged by a pawl to lock the steering column assembly in the position selected by the driver. A bracket is provided to positively hold the pawl engaged with the rack and prevent it from becoming disengaged. The tilt of the steering column can only be re-adjusted by moving the bracket so that the pawl can disengage the rack.

4 Claims, 3 Drawing Sheets

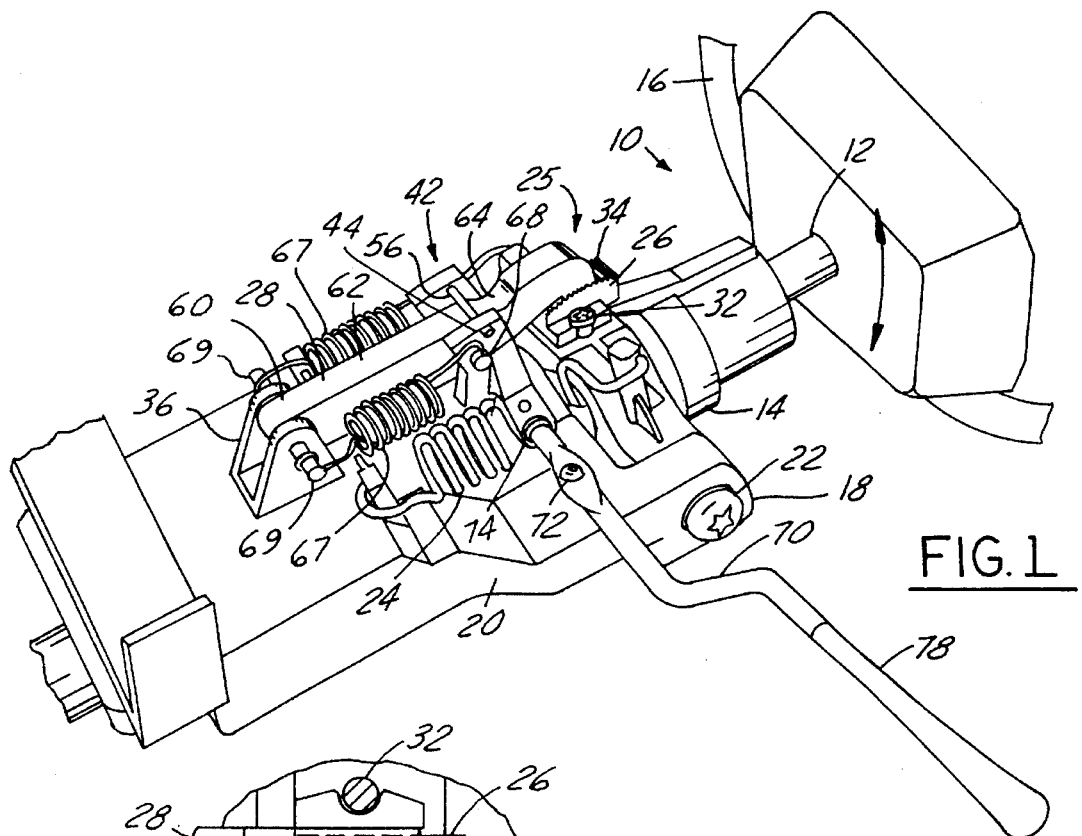

TILT STEERING COLUMN LOCKING MECHANISM

This invention relates generally to tilt steering columns for automotive vehicles, and more particularly to apparatus for releasably locking a tilt steering column in adjusted position.

BACKGROUND AND SUMMARY

Many automobiles have steering columns which can be tilted to an adjusted position selected by the individual driver. A locking mechanism is provided to hold the steering column in the selected position. The mechanism will positively lock the steering column in the selected position.

In accordance with the present invention, the steering column assembly has a locking mechanism comprising a rack and a pawl which are engaged to lock the steering column in adjusted position. A bracket is provided to positively hold the pawl engaged with the rack. When it is desired to change the angle of the steering column, the bracket may be moved to a release position allowing the pawl to be disengaged.

One object of this invention is to provide a locking mechanism for a tilt steering column which is positive in operation.

Another object is to provide apparatus for locking the tilt steering column in adjusted position which is composed of a relatively few simple parts, is rugged and durable in use, and can be inexpensively manufactured and assembled.

Other objects, features and advantages of the invention will become more apparent from the following description and claims, especially when considered with the accompanying drawings.

BRIEF DESCRIPTION OF THE DRAWINGS

FIG. 1 is a perspective view of apparatus for releasably locking the tilt steering column of an automobile in adjusted position, constructed in accordance with the invention.

FIG. 2 is a top plan view of the apparatus shown in FIG. 1.

FIG. 2A is an enlarged detail of a portion of the structure in FIG. 2.

DETAILED DESCRIPTION

Figure 3:
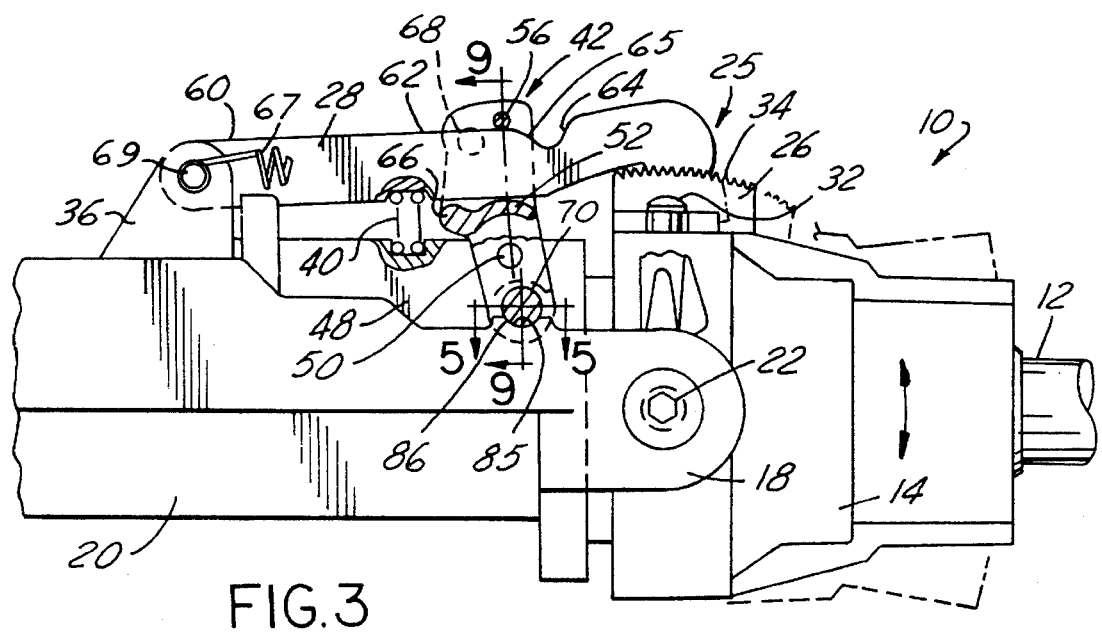
FIG. 3 is a side elevational view with parts broken away and in section, as seen on the line 3—3 in FIG. 2.

Referring now more particularly to the drawings, the steering column assembly 10 comprises a steering column 12 mounted in a housing 14, with a steering wheel 16 on the upper end of the steering column. The steering column housing 14 extends between the arms 18 of a support structure 20 and is pivoted to the arms 18 by horizontal pivots 22 for vertical adjustment about an axis perpendicular to the longitudinal center line of the vehicle and of the steering column. The pivotal support for the housing 14 permits the steering column 12 to be adjusted vertically as shown by the arrow in FIG. 1 to a position desired by the driver, but within a range in which the steering column extends at an angle generally upwardly and rearwardly of the motor vehicle. Coil springs 24 are secured at their ends to the support structure 20 and to the housing 14 and urge the housing to swing upwardly to a limiting position making it easier for the driver to get in and out of the vehicle. The support structure 20 is rigidly secured to the automobile frame.

A locking mechanism 25 comprises a rack 26 and an elongated pawl 28. The locking mechanism is provided to releasably lock the steering column assembly 10 in adjusted position. The rack 26 is secured to the upper surface of the housing 14 by fasteners 32 and has a series of spaced apart rack teeth 34 extending perpendicular to the axis of pivotal adjustment of the steering column housing 14. The pawl 28 extends perpendicular to the axis of pivotal adjustment of the steering column housing. The rear end of the pawl is pivoted for vertical pivotal movement on a cleat 36 rigidly mounted on the upper surface of the support structure 20. The front end of the pawl 28 has a series of spaced apart teeth 38 on its lower surface which are opposed and complementary to the rack teeth 34 and when engaged with the rack teeth lock the steering column housing 14 in adjusted position. A compression coil spring 40 is mounted in the upper surface of the support structure 20 beneath the pawl 28 and about midway between the ends of the pawl and presses upwardly against the pawl urging it to a position in which the pawl teeth are disengaged from the rack teeth.

The pawl 28 can be held down in an operative position in which the pawl teeth 38 engage the rack teeth 34 by a bracket 42. The bracket has laterally spaced legs 44 and 46 which straddle an upstanding mounting portion 48 on the support structure 20. The legs are pivotally connected to the mounting portion 48 by a horizontal pivot pin 50 which extends perpendicular to the pawl 28. The legs 44 and 46 are connected to one another about midway of their length by an integral web 52 which is disposed above the mounting portion 48 and beneath the pawl. A horizontal lock or cam pin 56 connects the upper ends of the legs 44 and 46 above the pawl.

The top of the pawl has a cam surface 60 and this cam surface has a locking surface portion 62 and a release surface portion 64. The locking surface portion 62 is generally flat and extends lengthwise of the pawl. The release surface portion 64 is forwardly of the locking surface portion 62 and extends in continuation of the locking surface portion and constitutes a dip or relief or depressed area relative to the locking surface portion 62. The bracket 42 can be pivoted between positions in which the cam pin 56 engages the locking surface portion 62 (FIG. 3) or the release surface portion 64 (FIG. 4).

The web 52 of the bracket has a lobe 66 at the rear edge. When the bracket is pivoted to its FIG. 4 position, the lobe 66 engages the underside of the pawl 28 and raises it to the position shown in which the pawl and rack teeth are disengaged. Spring 40 assists in raising the pawl. The release surface portion 64 has an inclined surface 65. Bracket pin 56 rides up surface 65 when the bracket is pivoted to the FIG.

3 position to cam the pawl down into engagement with the rack teeth.

Figure 4:
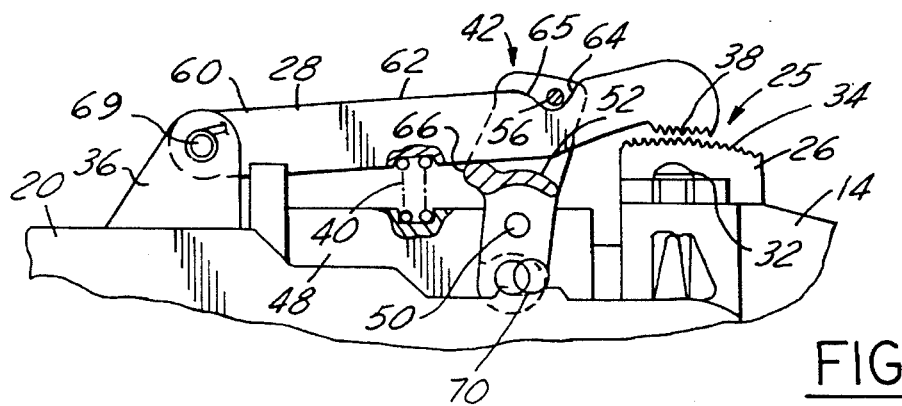
FIG. 4 is a view of a portion of FIG. 3, but showing the rack and pawl teeth of the locking mechanism disengaged.
Figure 5:
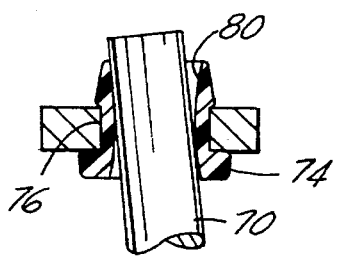
FIG. 5 is a sectional view taken on the line 5—5 in FIG. 3.
Figure 6:
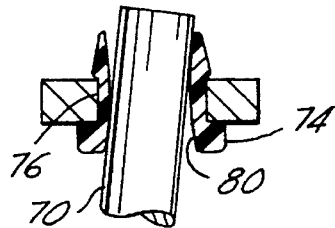
FIG. 6 is a sectional view similar to FIG. 5, but showing the parts in a different position.
Figure 7:
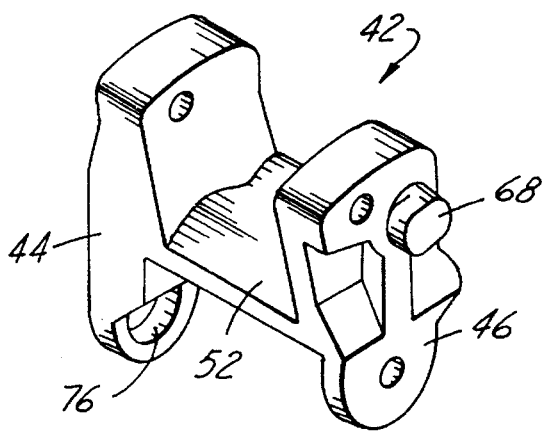
FIG. 7 is a perspective view of the bracket for holding the pawl of the locking mechanism engaged to prevent accidental release, but with the bracket pin removed.
Figure 8:
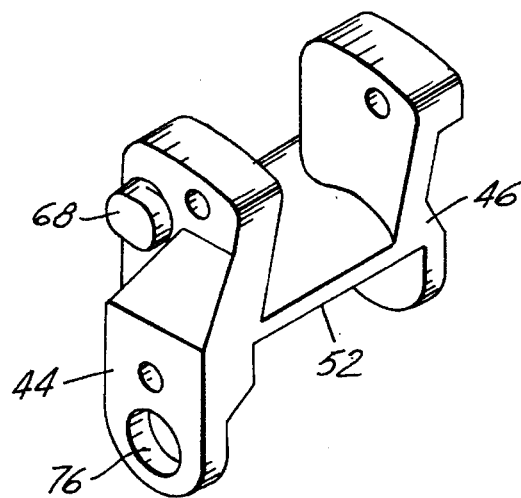
FIG. 8 is a perspective view of the bracket shown in FIG. 7 as seen from the opposite side.
Figure 9:
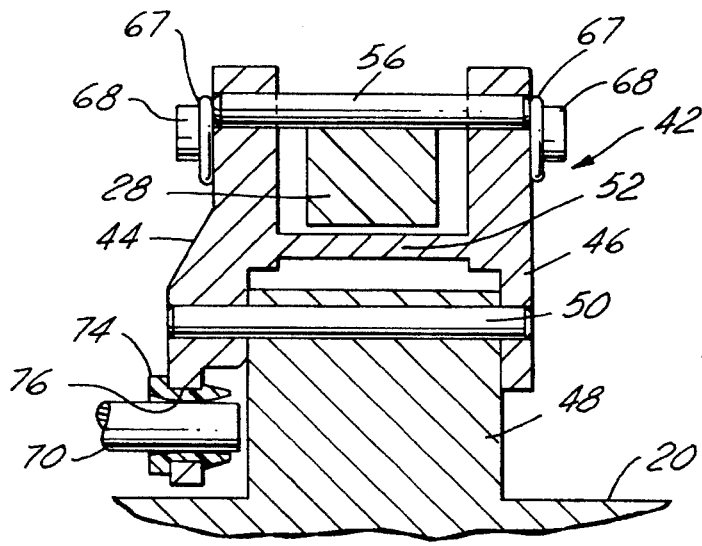
FIG. 9 is a fragmentary sectional view taken on the line 9—9 in FIG. 3.

Bracket 42 is urged to its FIG. 3 position by tension coil springs 67 connected to anchors 68 on the bracket legs and to pins 69 on cleat 36.

The bracket 42 can be pivoted from the FIG. 3 position to the FIG. 4 position and back by a lever 70. Lever 70 is pivoted intermediate its ends on a pivot 72 mounted in fixed position on the support structure 20. The lever has the inner end pivotally connected in a grommet 74 in a hole 76 of bracket leg 44 and has a handle 78 at the outer end. The grommet 74 is a tubular member in which the internal bore 80 is circular throughout its length but flaring at the ends to provide a swivel support for the lever 70 which extends through the bore 80. In the FIG. 3 position of the bracket 42, lever 70 is cradled in a recess 85 provided in a rest 86 formed integrally on the top surface of the support structure 20.

This recess 85, as well as the relationship of cam pin 56 to the locking surface portion 62 of the pawl and the coefficient of friction of the parts, ensures that the bracket will not accidentally shift from its FIG. 4 position holding the pawl down on the rack. The locking surface portion 62 is roughly perpendicular to the direction of any pivotal movement of the pawl at the point where surface 62 contacts the pin 56 of bracket 42, reducing if not altogether eliminating any tendency of the pin 56 to accidentally slide over surface 62 when in the FIG. 3 position.

In use, the locking mechanism is shown in it usual position in FIG. 3, with the pawl teeth held engaged with the rack teeth by the bracket pin 56 bearing down on the locking surface portion 62 of the pawl. This provides a positive lock and prevents disengagement of the rack and pawl teeth under any and all conditions of vehicle operation. When it is desired to change the tilt of the steering column, the lever 70 is manipulated to pivot the bracket 42 to the FIG. 4 position. Lobe 66 on the bracket lifts the pawl, assisted by spring 40, to disengage the rack and pawl teeth. When the lever 70 is again manipulated to return the bracket 42 to the FIG. 3 position, the pin 56 rides up the inclined surface 65 of the release surface portion 64 to cam the pawl down into engagement with the rack teeth.

What is claimed is:

1. Apparatus for releasably locking the tilt steering column of an automotive vehicle in adjusted position, comprising support structure adapted to be affixed to the vehicle frame, a steering column assembly, means pivotally mounting said steering column assembly on said support structure for vertical pivotal movement, a rack carried by said steering column assembly and having rack teeth, a pawl having first and second ends, pawl teeth at said first end of said pawl, means pivoting said second end of said pawl to said support structure for pivotal movement of said pawl to positions engaging and disengaging said rack and pawl teeth, a cam bracket, means pivoting said cam bracket to said support structure for movement between first and second positions, said pawl having a cam surface provided with locking and release surface portions, said cam bracket having a lock pin slidable over said cam surface and engageable with said locking surface portion thereof in its first position and with said release surface portion thereof in its second position, said pawl, when said cam bracket is in its first position, being moved by said lock pin to its position engaging said rack and pawl teeth to lock said steering column assembly in adjusted position and when said cam bracket is in its second position, being released by said lock pin for movement to its position disengaging said rack and pawl teeth and releasing said steering column assembly, means operative when said bracket is moved to its second position for moving said pawl to its position disengaging said rack and pawl teeth, said means for moving said pawl to its position disengaging said rack and pawl teeth comprising a part on said bracket engageable with said pawl, and a lever for moving said cam bracket to its first and second positions, said pawl being elongated and having inner and outer sides, said pawl teeth being on the inner side of said pawl, said cam surface being on the outer side of said pawl, said release surface portion of said cam surface extending in continuation of said locking surface portion and being depressed relative to said locking surface portion.

2. Apparatus as defined in claim 1, wherein said bracket has a pair of legs straddling said pawl, and said pin extends across the outer side of said pawl and has its ends secured to said legs.

3. Apparatus as defined in claim 2, wherein said depressed release surface portion of said pawl has an inclined surface engaged by said pin when said bracket is moved to its first position to move said pawl teeth into engagement with said rack teeth.

4. Apparatus as defined in claim 3, wherein said lever has first and second ends, said first end being connected to one leg of said bracket, and a tubular grommet on said support structure through which the midportion of said lever extends providing a swivel mount for said lever.

* * * * *